2,749,344
PYRIMIDINE COMPOUNDS

George H. Hitchings, Tuckahoe, and Roland K. Robins, Yonkers, N. Y., assignors to Burroughs Wellcome & Co. (U. S. A.) Inc., Tuckahoe, N. Y., a corporation of New York No Drawing. Application January 2, 1953,
Serial No. 329,476

8 Claims. (Cl. 260—256.4)

This invention comprises a new group of pyrido (2,3-d) pyrimidines and a new method for the preparation of derivatives of this ring system. These substances are of value as pharmaceutical intermediates. They also are of value as inhibitors of microorganisms. This property is especially marked in the 2,4-diamino derivatives bearing alkyl or aryl substituents in the pyridine moiety. It is believed that these substances act as antagonists of the folic acid family of metabolites but this interpretation is not essential to their use.

The new method of preparation of derivatives of the pyrido (2,3-d) pyrimidine system consists in the condensation of a 4-aminopyrimidine with a β-dicarbonyl reagent. The pyrimidines are selected from the group of 4-aminopyrimidines having 2,6-diamino, 2,6-dihydroxy, 2 - amino - 6 - hydroxy and 2 -mercapto - 6 - hydroxy substituents. The dicarbonyl reagents optimally are β-diketones or β-ketoaldehydes. The condensation is carried out optimally by warming a mixture of the pyrimidine and the dicarbonyl reagent in a strongly acid medium such as phosphoric or sulfuric acid and recovering the product by dilution and neutralization. In some instances the diamino derivatives are conveniently isolated as the phosphate salts.

The following examples illustrate the teachings of this invention, without limitation of its scope which is defined in the claims.

EXAMPLE 1

*Preparation of 2,4-diamino-5,7-dimethyl pyrido (2,3-d) pyrimidine*

2,4,6-triaminopyrimidine (5 g.) and acetylacetone (3 g.) were heated with 25 ml. of 85% $H_3PO_4$ for 5 hours on the steam bath. The solution was diluted to 250 ml. and made basic to a pH of 9 with concentrated ammonium hydroxide. There deposited from the warm solution on standing colorless needles, M. P. 293–295° dec. (unc.).

EXAMPLE 2

*Preparation of 2-amino-4-hydroxy-5,7-dimethylpyrido (2,3-d) pyrimidine*

2,4-diamino-6-hydroxypyrimidine (10 g.) and 10 g. of acetylacetone were added to 50 ml. of 85% syrupy phosphoric acid and heated on the steam bath for 4 hours. The brown solution was cooled and diluted to 500 ml. and made basic to a pH of 9 with concentrated ammonium hydroxide. The crude product was filtered and purified by dissolving in dilute hydrochloric acid and precipitating with ammonium hydroxide. Yield, 7.2 g., M. P. about 360°.

EXAMPLE 3

*Preparation of 2,4-dihydroxy-5,7-dimethylpyrido (2,3-d) pyrimidine*

2,4-dihydroxy-6-aminopyrimidine (12.7 g.) and 10 g. of acetylacetone and 60 ml. of $H_3PO_4$ were heated 5½ hours on the steam bath. The crude reaction mixture was diluted with 250 ml. of warm water and allowed to remain overnight. Filtration yielded 11.0 g. of product which was recrystallized from glacial acetic acid to give 7.5 g. of white crystals.

EXAMPLE 4

*Preparation of 2,4-diamino-7-phenyl-6-methylpyrido (2,3-d) pyrimidine*

2,4,6-triaminopyrimidine (12.5 g.) and 16.2 g. of 3 - phenyl - 2 - methylpropan - 3 one - 1 - al (Ber. 22, 3276) were added to 70 ml. of $H_3PO_4$ and heated on the steam bath for 5 hours. The solution was diluted to 500 ml. with water and made basic to a pH of 9 with concentrated ammonium hydroxide. The precipitate was filtered and washed and suspended in 100 ml. of 2 N sodium hydroxide and heated 1 hour on the steam bath and filtered. The precipitate was recrystallized from ethanol-water mixture. Yield, 2.5 g., M. P. 287–290°. A small amount was crystallized from absolute ethanol for analysis.

EXAMPLE 5

*Preparation of 2,4-diamino-7-ethyl-6-methylpyrido (2,3-d) pyrimidine*

6.3 g. of 2,4,6-triaminopyrimidine and 6.8 g. of the sodium salt of 2-methyl-penta-3-one-1-al (Ber. 22, 3277) and 40 ml. of 85% phosphoric acid were heated together as in Example 4 and the product worked up in a similar manner to give 2.2 g. of product, M. P. 304–305°.

EXAMPLE 6

*Preparation of 2,4-diamino-7-(p-chlorophenyl) pyrido (2,3-d) pyrimidine*

6.3 g. of 2,4,6-triaminopyrimidine and 10.2 g. of the sodium salt of 3-(p-chlorophenyl) propan-3-one-1-al (Ber. 61, 2253) and 120 ml. of 85% $H_3PO_4$ were heated 4 hours on the steam bath and reaction mixture worked up as in Example 4 to give 1.6 g. of a product, M. P. 311°.

EXAMPLE 7

*Preparation of 2,4-diamino-7-phenylpyrido (2,3-d) pyrimidine*

The preparation of this compound was carried out as in Example 6 using 6 g. of triaminopyrimidine and 10 g. of 3-phenyl-propane-3-one-1-al, to yield yellow needles, M. P. 289–290°.

EXAMPLE 8

*Preparation of 2,4-diamino-5,7-diphenylpyrido (2,3-d) pyrimidine*

This preparation was carried out as in Example 1 substituting 7 g. dibenzoylmethane for the acetylacetone, to yield yellow prisms, M. P. 288–290°.

EXAMPLE 9

*Preparation of 2,4-dihydroxy-5,6,7-trimethylpyrido (2,3-d) pyrimidine*

The preparation was carried out using methylacetylacetone in a manner similar to that employed in Example 3 to yield a compound, M. P. 308–310°.

EXAMPLE 10

*Preparation of 2,4-diamino-7-phenyl-6-ethylpyrido (2,3-d) pyrimidine*

To 50 ml. of 85% $H_3PO_4$ was added 6.3 g. of 2,4,6-triaminopyrimidine and 8.8 g. of 2-ethyl-3-phenyl-propanone-3-al-1 (Ber. 22, 3278) and solution heated on the steam bath for 4 hours and the reaction mixture worked up as in Example 4 to yield 2.1 g. of white needles, M. P. 281–282°.

EXAMPLE 11

*Preparation of 2,4-diamino-7-n-propyl-6-ethylpyrido (2,3-d) pyrimidine*

Eight and two-tenths grams of the sodium salt of 2-ethylhexone-3-one-1-al and 63 g. of 2,4,6-triaminopyrimidine were heated in 40 ml. of phosphoric acid for 2 hours on the steam bath to yield 2.1 g. of crude product. Isolated as in previous examples, recrystallization from ethanol yielded 1.4 g., M. P. 197°.

EXAMPLE 12

*Preparation of 2,4-diamino-5,6,7-trimethylpyrido (2,3-d) pyrimidine*

Eight grams of 2,4-dihydroxy-5,6,7-trimethylpyrido (2,3-d) pyrimidine was added to 100 ml. of phosphorus oxychloride and the solution refluxed 2 hours, the excess phosphorus oxychloride was distilled off under reduced pressure and the syrupy residue poured on ice and extracted with chloroform. The residue from the chloroform extraction, which consisted of crude 2,4-dichloro-5,6,7-trimethylpyrido (2,3-d) pyrimidine, was heated with alcoholic ammonia at 155° overnight and the product isolated as in Example 15 to yield 0.6 g. of product, M. P. 314°.

EXAMPLE 13

*Preparation of 2,4-diamino-6,7-dimethylpyrido (2,3-d) pyrimidine*

From 12.5 g. of 2,4,6-triaminopyrimidine and 12.2 g. of the sodium salt of 2-methyl butanone-3-al-1 dissolved in 100 ml. of 85% phosphoric acid and heated 4 hours on the steam bath was isolated as in Example 4, 2.4 g. of a product, M. P. dec. >350°.

EXAMPLE 14

*Preparation of 2-mercapto-4-hydroxy-5,7-dimethylpyrido (2,3-d) pyrimidine*

To 50 ml. of 85% $H_3PO_4$ was added 14.3 g. of 2-mercapto-4-hydroxy-6-aminopyrimidine and 10.0 g. of acetylacetone. The reaction mixture was heated 4 hours on the steam bath and then diluted with 400 ml. of water and filtered and washed with water. The crude product was dissolved in dilute sodium hydroxide and precipitated with acetic acid. Yield of 2-mercapto-4-hydroxy-5,7-dimethylpyrido (2,3-d) pyrimidine was 11.5 g., M. P. 285°.

EXAMPLE 15

*Preparation of 2,4-diamino-6,7-trimethylenepyrido (2,3-d) pyrimidine*

Forty-one grams of 2,4,6-triaminopyrimidine and 44 g. of the sodium salt of 2-formylcyclopentanone were heated together for 5 hours in 150 ml. of 85% phosphoric acid. The solution was then diluted to 500 ml. with water and then neutralized to a pH of 9 with concentrated ammonium hydroxide and filtered. The crude precipitate was dissolved in dilute hydrochloric acid, heated with norite, filtered and the solution made basic with sodium hydroxide. The yield was 13.0 g., M. P. >360°. A small amount was recrystallized twice from ethanol-water for analysis.

EXAMPLE 16

*2,4-diamino-6,7-tetramethylenepyrido (2,3-d) pyrimidine*

6.3 g. of 2,4,6-triaminopyrimidine and 6 g. of formylcyclohexanone were reacted together and the product isolated as described for the formylcyclopentanone derivative in Example 15, to give 5,6-tetramethylenepyrido (2,3-d) pyrimidine.

We claim:

1. A method of preparing pyrido (2,3-d) pyrimidines which consists in the condensation of a 4-aminopyrimidine with a compound selected from the class consisting of a β-carbonyl aldehyde and a β-carbonyl ketone as set forth in claim 8 in an acidic medium.
2. The method of claim 8 wherein the medium is 85% phosphoric acid.
3. The method of claim 8 wherein the medium is concentrated sulfuric acid.
4. The method of claim 8 wherein a 2,4,6-triaminopyrimidine is used.
5. The method of claim 8 wherein a 4-amino-2,6-dihydroxypyrimidine is used.
6. The method of claim 8 wherein a 2,4-diamino-6-hydroxypyrimidine is used.
7. The method of claim 8 wherein a 4-amino-6-hydroxy-2-mercaptopyrimidine is used.
8. The method of preparing pyrido (2,3-d) pyrimidines of the formula:

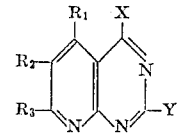

wherein X and Y are selected from the class consisting of hydroxyl, amino and mercapto radicals, and hydrogen, $R_1$, $R_2$ and $R_3$ are selected from the class consisting of the alkyl and phenyl radicals and hydrogen, and $R_1$ and $R_2$ in ring form are selected from the class consisting of the trimethylene and tetramethylene radicals, which comprises reacting a compound of the formula:

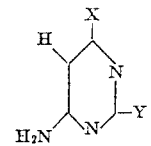

with a compound having the formula

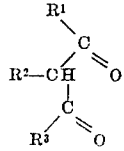

in which X, Y, $R^1$, $R^2$, and $R^3$ have the above-indicated values.

References Cited in the file of this patent

Klisiecki et al.: Chem. Abst., vol. 19, p. 72 (1925).
McLean et al.: J. Chem. Soc. (London), 1949, 2582–85.